United States Patent
Stendardi et al.

(10) Patent No.: US 10,357,028 B1
(45) Date of Patent: Jul. 23, 2019

(54) MULTI-VOICED GAME CALL DEVICE

(71) Applicant: Chris Stendardi, Yonkers, NY (US)

(72) Inventors: Tulio Stendardi, Yonkers, NY (US); Chris Stendardi, Yonkers, NY (US)

( * ) Notice: Subject to any disclaimer, the term of this patent is extended or adjusted under 35 U.S.C. 154(b) by 0 days.

(21) Appl. No.: 16/038,522

(22) Filed: Jul. 18, 2018

Related U.S. Application Data

(60) Provisional application No. 62/604,686, filed on Jul. 17, 2017.

(51) Int. Cl.
*A63H 5/00* (2006.01)
*A01M 31/00* (2006.01)

(52) U.S. Cl.
CPC ................... *A01M 31/004* (2013.01)

(58) Field of Classification Search
CPC .................................... A01M 31/004
USPC ............... 473/397, 404, 408, 418–422, 410
See application file for complete search history.

(56) References Cited

U.S. PATENT DOCUMENTS

| | | | | |
|---|---|---|---|---|
| 3,367,064 A * | 2/1968 | Anthony | ............. | A01M 31/004 446/397 |
| 4,988,325 A * | 1/1991 | Alderson | ............. | A01M 31/004 446/397 |
| 6,149,492 A * | 11/2000 | Davis, Jr. | ............. | A01M 31/004 446/202 |
| 6,210,252 B1 * | 4/2001 | Anderson | ............. | A01M 31/004 446/397 |
| 6,264,527 B1 * | 7/2001 | Sabol, Jr. | ............. | A01M 31/004 446/397 |
| 6,676,479 B1 * | 1/2004 | Zimmerman | ............. | A01M 31/004 446/397 |
| 7,169,009 B2 * | 1/2007 | Marsh | ............. | A01M 31/004 446/397 |
| 7,241,195 B2 * | 7/2007 | Bauer | ............. | A01M 31/004 446/202 |
| 8,147,290 B2 * | 4/2012 | Rydbom | ............. | A01M 31/004 211/69.8 |
| 8,944,879 B1 * | 2/2015 | Williams | ............. | A01M 31/004 446/397 |
| 9,155,296 B2 * | 10/2015 | Moss | ............. | A01M 31/004 |

* cited by examiner

*Primary Examiner* — Nini F Legesse
(74) *Attorney, Agent, or Firm* — Smith Tempel Blaha LLC; Matthew T. Hoots

(57) ABSTRACT

Disclosed is a multi-voiced game call device comprising a box and striker arrangement. Embodiments of the multi-voiced game call device comprise a slate box that is rectangular in shape and comprises a thin bottom surface with a sound hole offset from center of the bottom surface. A slate top plate configured to interface with the slate box closes in the box such that a sound chamber is defined between the top plate and the bottom surface. A striker that has a body and two or more striker components extending through the body is configured such that a user may grasp the body and pull at least one of the striker components across the slate top plate to generate pressure waves within the sound chamber. The two or more striker components may be of different sizes and/or materials in order to generate different tone and pitch qualities, i.e. multiple voices.

8 Claims, 6 Drawing Sheets

US 10,357,028 B1

MULTI-VOICED GAME CALL DEVICE

BACKGROUND

Embodiments of the present solution are generally directed to game call devices and, more specifically, to game call devices that utilize a slate surface coupled with a striker.

As those of ordinary skill in the art of hunting and/or wildlife observation would understand, effective game calling requires the ability to not only generate multiple game calls that imitate calls made by animals, but to generate multiple game calls that sound like they were generated by different animals of the same species. For instance, while the ability to make a realistic "cluck" of a hen turkey is useful when hunting turkeys, the ability to make a first "cluck" that sounds like it's coming from a first hen turkey and a second "cluck" that sounds like it's coming from a second hen turkey may be particularly advantageous. As such, it is not uncommon for outdoorsmen to carry multiple game call devices of different types, designs, specifications or models in order to be able to impersonate multiple animals of the same species. Carrying multiple game call devices, and switching between them while in the field, can be cumbersome. Further, because different game call device designs inevitably require different techniques for their usage, mastery of multiple game call devices can be difficult for the average outdoorsman.

As would be further understood by those of ordinary skill in the art of hunting and/or wildlife observation, even the best, most realistic impersonation of a game call is all but useless unless it can be heard in the field at a significant range. Consequently, the ability to project a game call to a relatively long distance is useful and desirable. Game call devices known in the art, however, tend to require the user to create resonance by "cupping" a hand or by some other means in order to project the sound generated by the device. The need to do so makes mastery of prior art game call devices difficult.

Therefore, there is a need in the art for a game call device that provides for the generation of game call sounds that seem to come from different animals of the same species. Further, there is a need in the art for a game call device that projects sound without the need for a user to "cup" a hand or use some other means for creating a sound chamber.

These needs, as well as other needs in the art, are addressed in the various embodiments of the solution as presented herein.

BRIEF SUMMARY

The various embodiments, features and aspects of the present invention overcome and/or fill some or all of the above-noted needs in the prior art. Embodiments include a multi-voiced game call device comprising a box and striker arrangement. Embodiments of the multi-voiced game call device comprise a slate box that is rectangular in shape and comprises a bottom surface with a sound hole, two vertical side walls, a vertical lower end wall, and a vertical upper end wall. A slate top plate configured to interface with the slate box closes in the box such that a sound chamber is defined. A striker that has a body and two or more striker components extending through the body is configured such that a user may grasp the body and pull at least one of the striker components across the slate top plate to generate pressure waves within the sound chamber.

The two or more striker components may be constructed from different materials such as wood and plastic, as may the body of the striker. Moreover, the two or more striker components may be cylindrical in shape and may comprise a hole drilled on their respective axis. The slate box may be constructed from wood and/or plastic. The two or more striker components extend beyond a lower end of the striker body and, in some embodiments, may also extend a distance outside an upper end of the striker body. The striker components may be fixed within the striker body by a press fit arrangement on the upper end but define a gap between the outer surfaces of the two or more striker components and the exit point at the lower end of the striker body.

The bottom surface of the slate box is about 1/16 of an inch thick in a preferred embodiment and the sound hole in the bottom surface is positioned closer to the vertical upper end wall than to the vertical lower end wall of the slate box. The sound hole may be elongate in shape and of a length and width that is 1/3 and 1/7, respectively, of the length and width of the bottom surface of the slate box.

The above-described and additional features may be considered, and will become apparent in conjunction with the drawings, in particular, and the detailed description that follow.

BRIEF DESCRIPTION OF THE SEVERAL VIEWS OF THE DRAWING

In the drawings, like reference numerals refer to like parts throughout the various views unless otherwise indicated. For reference numerals with letter character designations such as "115L" or "115U", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The present disclosure is directed towards providing an improved multi-voiced game call device. An exemplary embodiment of the solution is in the form of a slate and striker game call device configured for generating turkey game calls. It will be understood, however, that although the exemplary embodiment illustrated in the figures and described herein is of a type and configuration envisioned for calling turkeys, the scope of the solution is not so limited to such embodiments. That is, it is envisioned that certain other embodiments within the scope of the solution may be configured for generating game calls associated with animals other than turkeys. Moreover, it is envisioned that embodiments of the solution will not be limited to embodiments configured for generating game calls associated with wild game or quarry; for example, it is envisioned that embodiments of the solution may be configured for generating calls associated with non-game animals such as, but not limited to, crows, songbirds, various predators, and the like. As such, the exemplary embodiments provided herein are considered adequate for disclosure of a fully enabled solution and shall not be used to suggest that the scope of the solution is limited to the particular embodiments provided herein.

In this description, unless the context clearly indicates otherwise, the terms "game call" and "call" are used interchangeably to refer to a sound generated by use of an embodiment of the solution, the sound meant to imitate a sound typically made by a certain species of animal.

In this description, unless the context indicates otherwise, the term "game call device" and the like refers to a device configured to generate a game call. Embodiments of the solution, generally referred to herein as "multi-voiced game call devices" fall within the broader definition of a game call device, as would be understood by one of ordinary skill in the art.

In this description, the term "voice" refers to a particular sound tone as it may be defined by levels of pitch, quality and strength. Notably, embodiments of the solution may be configured to generate multiple voices, each voice having a different tone that results from a different striker component. Advantageously, because embodiments of the solution may generate multiple voices, users of the solution may convincingly imitate different animals of the same species and/or different animals of different species.

Turning now to the figures in which like labels refer to like elements throughout the several views, various embodiments, aspects and features of the present solution are presented.

Figure 1:
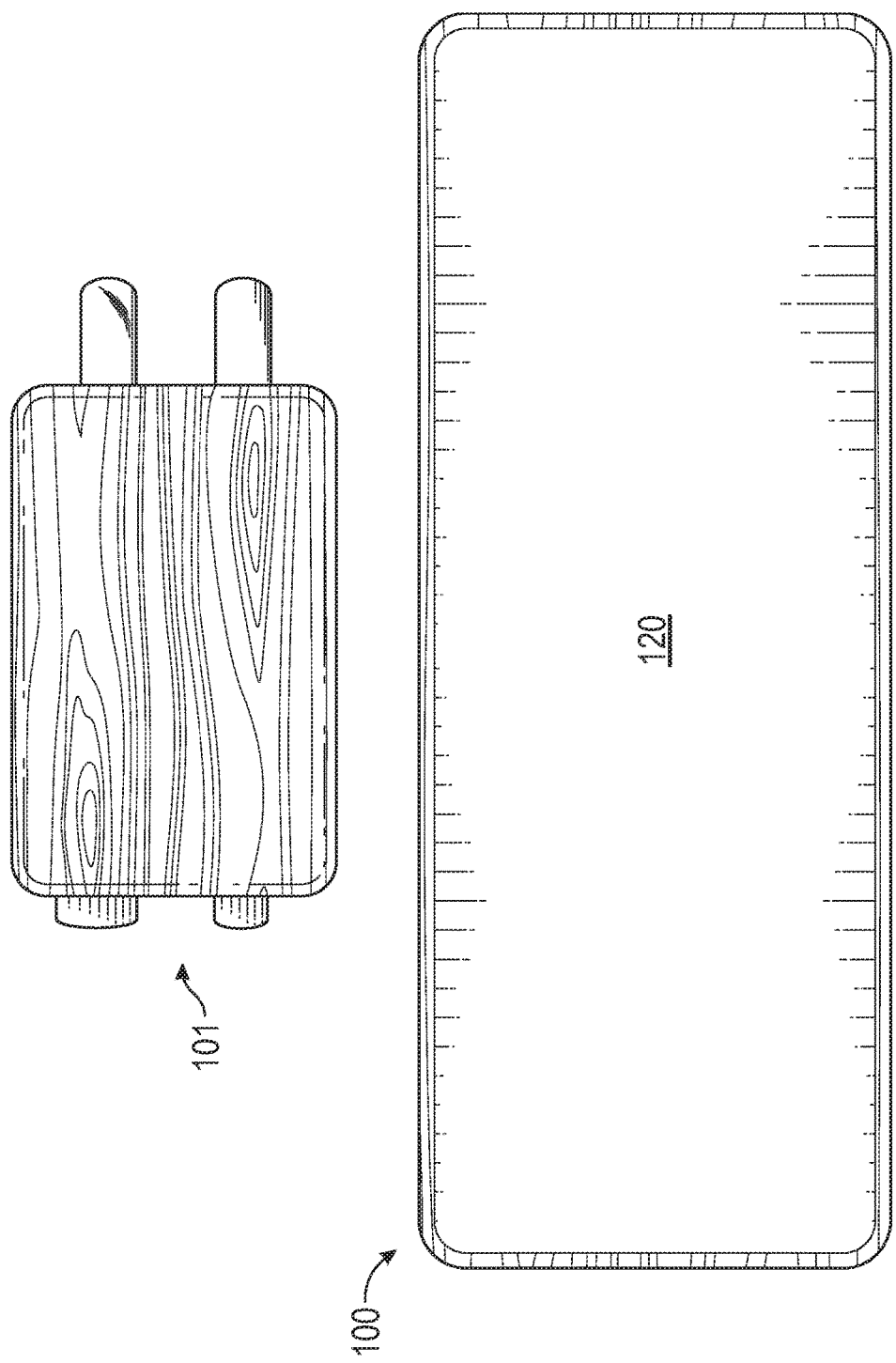
FIG. 1 illustrates an exemplary embodiment of a multi-voiced game call device according to the solution, the device comprising a slate box and striker.

FIG. 1 illustrates an exemplary embodiment of a multi-voiced game call device according to the solution, the device comprising a slate box 100 and striker 101. The slate box 100 includes a top plate comprising a slate surface 120 or equivalent. As will become more apparent from subsequent figures, the striker 101 comprises a body with at least two striker components. As would be understood by one of ordinary skill in the art of using a slate and striker game call device, a user may hold the slate box 100 in one hand and the striker 101 in the other. Subsequently, one of the at least two striker components may be applied to the slate surface 120 by "scratching" or "dragging" or "pulling" the striker component in a desired pattern while applying a desired amount of force. The result may be the generation of a game call as mechanical energy generated by the striker component application creates pressure waves within the slate box 100 that emanate as sound waves.

Figure 2:
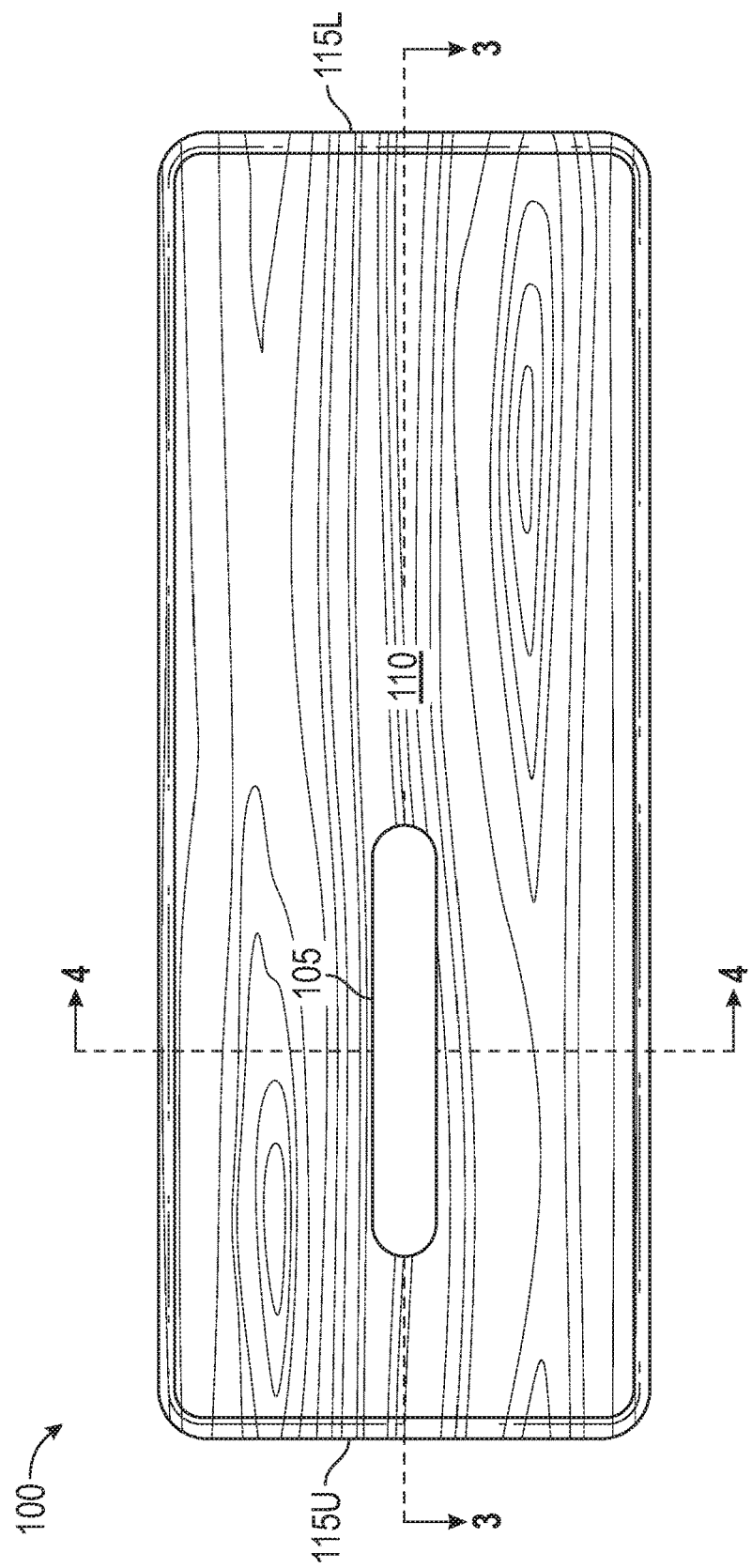
FIG. 2 is a bottom view of the slate box shown in the FIG. 1 illustration.

FIG. 2 is a bottom view of the slate box 100 shown in the FIG. 1 illustration. As can be seen in the FIG. 2 illustration (as well as other figure illustrations), the slate box 100 is constructed from a wood material (with the exception of the slate surface 120) having four sides and a bottom 110. Although a preferred embodiment of the slate box 100 is constructed from wood, it is envisioned that other embodiments may be constructed from a material other than wood such as, but not limited to, a plastic.

The slate box 100 is elongated in a rectangular form, with an upper end 115U and a lower end 115L. In use, a user may hold the slate box 100 toward the lower end 115L such that the sound hole 105 is unobstructed. Advantageously, a user of a multi-voiced game call device according to the solution does not have to hold the slate box 100 in such a way as to create a sound chamber with his hand, as will become more apparent from the description of subsequent figures.

Returning to the FIG. 2 illustration, it can be seen that the slate box 100 has a flat bottom surface 110 that comprises a sound hole 105 located off center and toward the upper end 115U. In a preferred embodiment, the flat bottom surface 110 is about 4¼ inches long, 1½ inches wide, and 1/16 of an inch thick, while the sides of the slate box are about ⅛ of an inch thick. As will be explained more thoroughly below, the relatively thin bottom surface 110 promotes amplification of sound as it is capable of flexing in response to pressure waves inside the sound chamber. The sound hole 105 is elongate and has a length that is approximately ⅓ the length of the bottom surface 110 and a width that is approximately 1/7 the width of the bottom surface 110. The size ratio of the sound hole 105 versus the bottom surface 110, as well as the placement of the sound hole 105, contributes to the performance of the multi-voiced game call device in that it promotes an amplified and projected sound wave.

Figure 3:
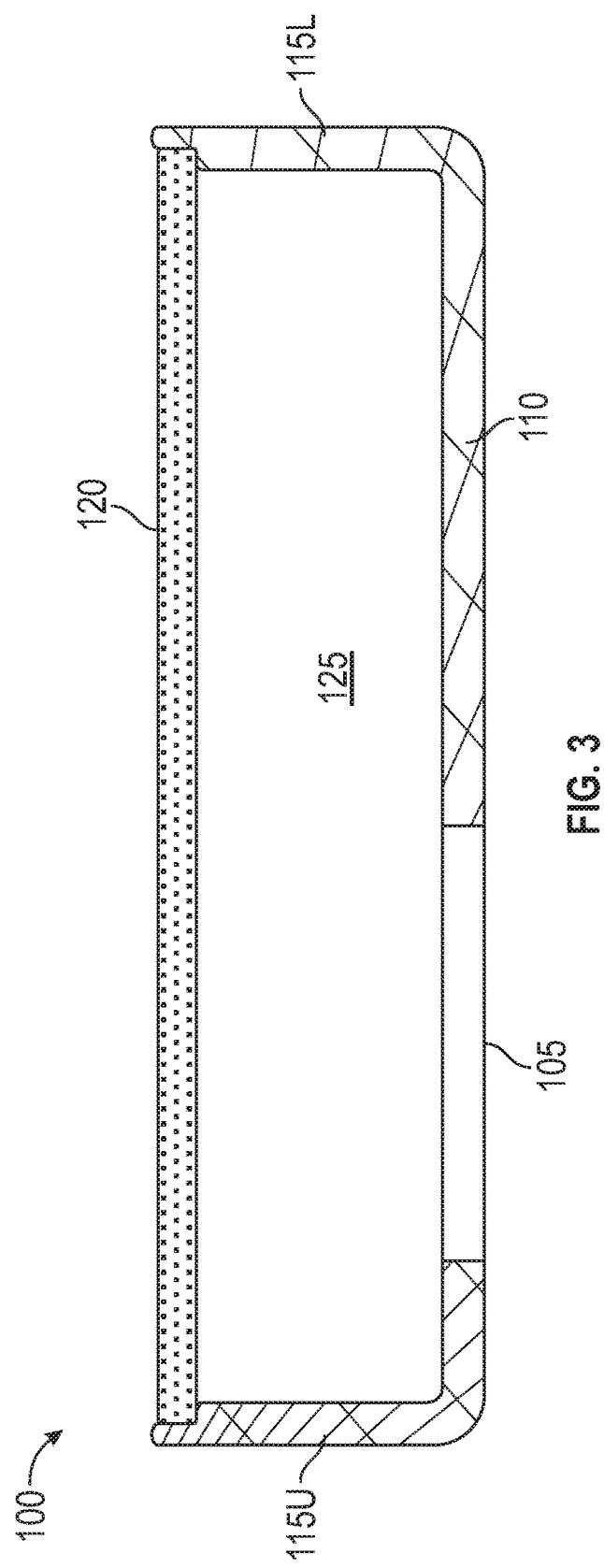
FIG. 3 is a side view of the slate box shown in the FIG. 1 illustration, cut along the cut line 3 shown in the FIG. 2 illustration.

Turning now to FIG. 3, illustrated is a side view of the slate box 100 shown in the FIG. 1 illustration, cut along the cut line 3 shown in the FIG. 2 illustration. As can be understood from the FIG. 3 illustration, the slate box 100 forms a sound chamber 125 beneath the slate top plate 120. Vibrations created by dragging a striker component on slate top plate 120 generate pressure waves in the sound chamber 125 that flex the bottom surface 110 which works as a soundboard. The amplified sound escapes the sound chamber 125 through the sound hole 105.

Figure 4:
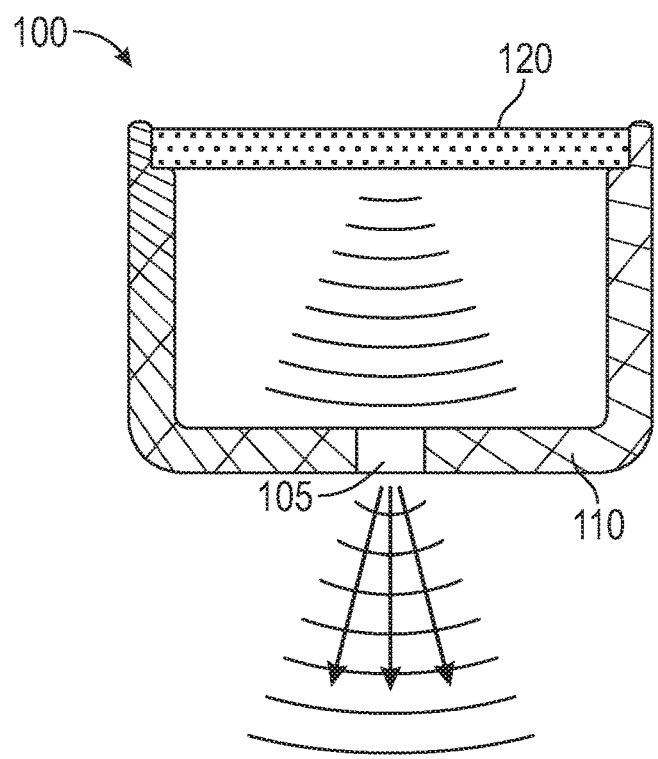
FIG. 4 is a side view of the slate box shown in the FIG. 1 illustration, cut along the cut line 4 shown in the FIG. 2 illustration.

FIG. 4 is a side view of the slate box 100 shown in the FIG. 1 illustration, cut along the cut line 4 shown in the FIG. 2 illustration. Notably, the FIG. 4 illustration includes a representation of the pressure waves described above relative to the FIG. 3 illustration. As can be understood from the FIG. 4 illustration, the amplified sound waves emanate from the sound chamber 125 through sound hole 105. Advantageously, because the multi-voiced game call device according to the present solution leverages a sound chamber 125 and sound hole 105 for amplifying and projecting the sound generated by use of the device, it is unnecessary for a user to fashion a sound chamber with a cupped hand or the like.

Figure 5:
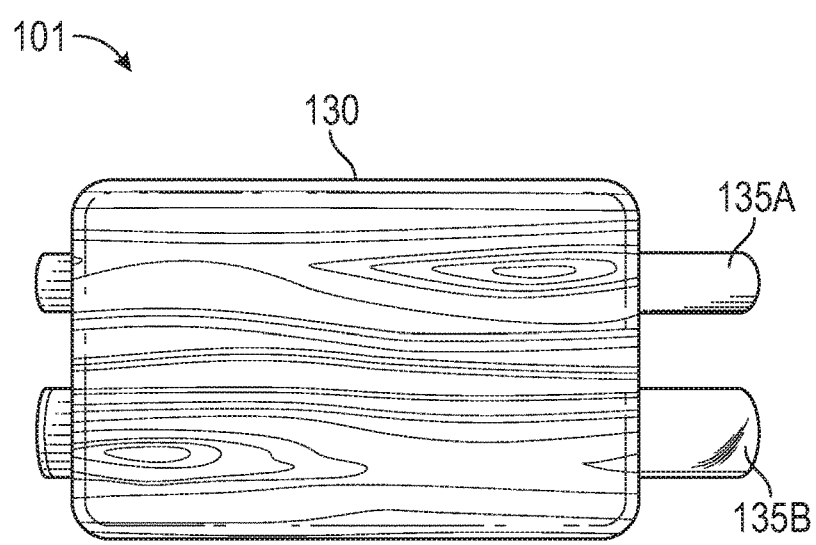
FIG. 5 is a side view of the striker shown in the FIG. 1 illustration.

FIG. 5 is a side view of the striker 101 shown in the FIG. 1 illustration. As can be seen in the illustration, the exemplary striker 101 comprises a body 130 and two striker components 135A, 135B. The body 130, in a preferred embodiment, is about 2¼ inches tall, 1½ inches wide, and 1 inch thick. Advantageously, the striker components 135 are constructed from different materials and may, depending on embodiment, also differ in size. In a preferred embodiment, the striker components 135 are each about ¼ of an inch in diameter. By virtue of their different materials and/or different sizes, the striker components 135 may generate different tones or pitches when applied to the slate top plate 120 of the slate box 100. In the exemplary embodiment shown in FIG. 5 and other figures, striker component 135A is made from a wood material whereas striker component 135B is made from an acrylic. In use, a user may hold the striker 101 by grasping the body 130 in hand while placing a finger over the top of one or both of striker components 135 where it protrudes through the body 130. In this way, the user can precisely control the force at which the other end of the striker component 135 is applied to the slate 120.

Figure 6:
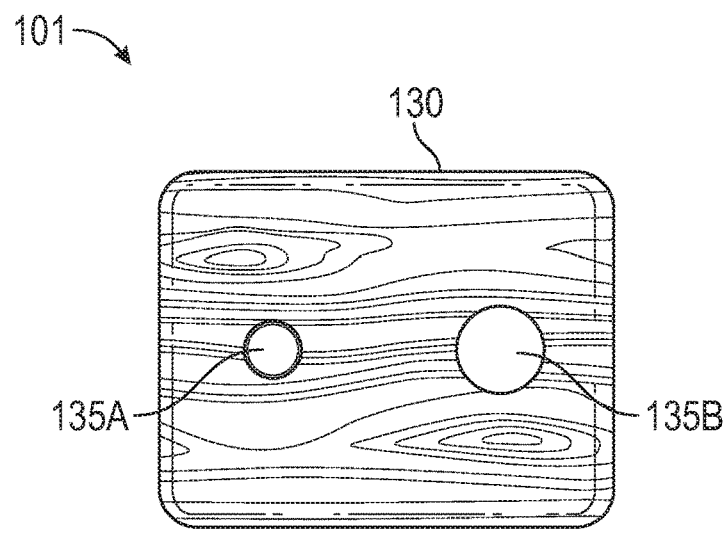
FIG. 6 is a top view of the striker shown in the FIG. 1 illustration.

FIG. 6 is a top view of the striker 101 shown in the FIG. 1 illustration. From this top view, it can be seen that the upper end of the striker components 135 are press fit into the body 130 of the striker 101. As would be understood by one of ordinary skill in the art, a press fit is accomplished by inserting a striker component 135 having a diameter that is slightly larger than the hole in the body 130 that is receiving the striker component 135. In this way, the slightly larger diameter of the striker component 135 makes for a tight and secure fit into the body 130 such that the striker component 135 won't slip or move vertically in the body 130. It is these upper ends of the striker components 135 that protrude above the press fit on the top of the striker 101 that may be engaged by a user in order to control the application pressure to the slate 120 (as described above relative to FIG. 5).

Figure 7:
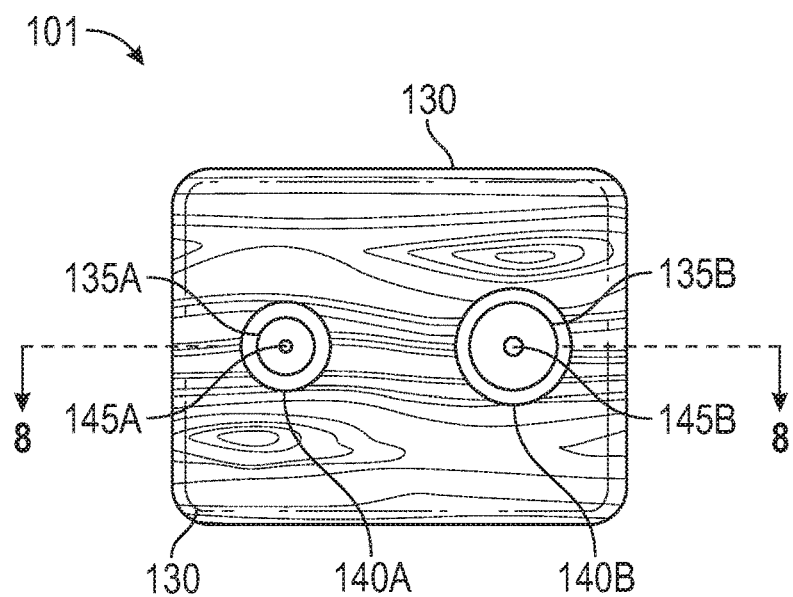
FIG. 7 is a bottom view of the striker shown in the FIG. 1 illustration.

FIG. 7 is a bottom view of the striker shown in the FIG. 1 illustration. As can be seen from the bottom view, the ends of the striker components 135, which are configured to be applied to the slate 120 as described above, comprise holes 145 drilled on their respective center axis. The addition of the holes 145A, 145B helps to generate a realistic game call sound as well as increase vibration on the slate 120. Further, it should be noted that the holes drilled in the body 130 of the striker 101 are bigger than the respective striker component 135 diameters on this lower end of the striker 101. Advantageously, therefore, a gap 140 is created between the striker component 135 and the body 130. This gap 140 allows for bend and flex in the respective striker components 135 when applied to the slate 120, thereby increasing vibration and the resulting sound generation. More detail can be seen regarding this aspect in FIG. 8.

Figure 8:
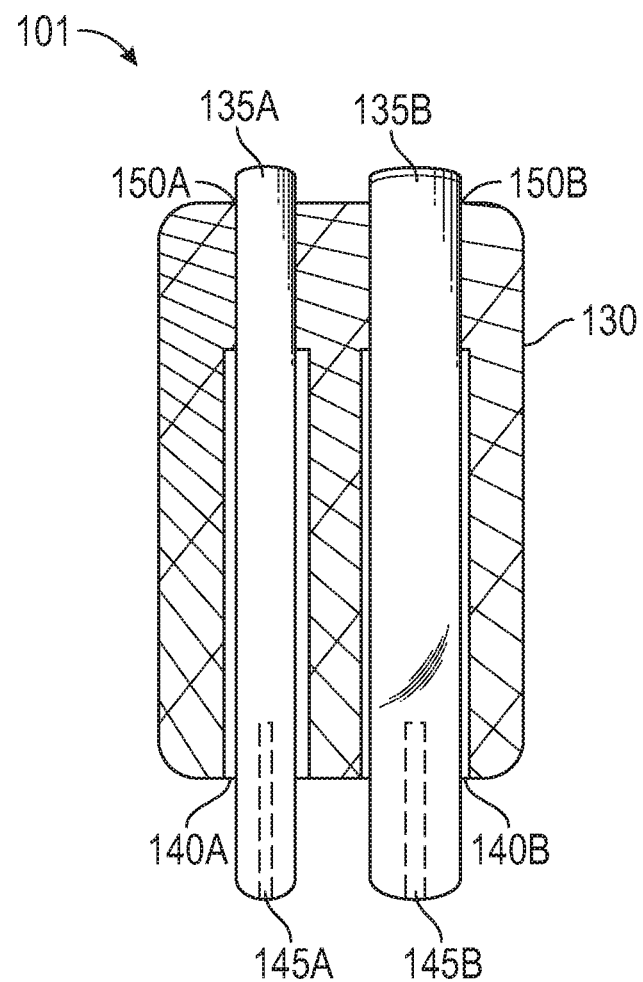
FIG. 8 is a side view of the striker shown in the FIG. 1 illustration, cut along the cut line 8 shown in the FIG. 5 illustration.

FIG. 8 is a side view of the striker 101 shown in the FIG. 1 illustration, cut along the cut line 8 shown in the FIG. 5 illustration. As can be better seen and understood from the FIG. 8 illustration, the respective striker components 135A, 135B are retained in the striker body 130 by virtue of a press fit arrangement 150 at the upper end of the striker body 130. Moreover, at the lower end of the striker body 130, the vertical holes in which the respective striker components 135 reside are bigger in diameter than the striker components 135, thereby creating a gap 140 that allows for flex of the striker components 135 when in use. This allowance for flexing of the striker components 135 provides additional vibration and improved control of sound generation.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A multi-voiced game call device comprising:
a slate box, wherein the slate box is rectangular in shape and comprises a bottom surface with a sound hole, two vertical side walls, a vertical lower end wall, and a vertical upper end wall;
a slate top plate configured to interface with the slate box such that a sound chamber is defined; and
a striker, wherein the striker comprises a body and two or more striker components extending through the body and configured to be pulled across the slate top plate to generate pressure waves within the sound chamber;
wherein each of the two or more striker components comprises a first end and a second end such that the first end extends a first distance outside an upper end of the striker body and the second end extends a second distance outside a lower end of the striker body; and
wherein each of the two or more striker components is cylindrical in shape and comprises a hole drilled on its axis from its second end.

2. The multi-voiced game call device of claim 1, wherein the two or more striker components comprise a first striker component constructed from wood and a second striker component constructed from plastic.

3. The multi-voiced game call device of claim 1, wherein the slate box is constructed from a material selected from a group consisting of wood and plastic.

4. The multi-voiced game call device of claim 1, wherein the two or more striker components are fixed within the striker body by a press fit arrangement.

5. The multi-voiced game call device of claim 1, wherein for a portion of a distance through which the two or more striker components extend through the striker body there is a gap between the outer surfaces of the two or more striker components and the striker body.

6. The multi-voiced game call device of claim 1, wherein the bottom surface of the slate box is about $1/16$ of an inch thick.

7. The multi-voiced game call device of claim 1, wherein the sound hole in the bottom surface is positioned closer to the vertical upper end wall than to the vertical lower end wall.

8. The multi-voiced game call device of claim 1, wherein the sound hole is elongate and is of a length and width that is $1/3$ and $1/7$, respectively, of the length and width of the bottom surface.

* * * * *